US011853113B2

(12) United States Patent
Sanderson et al.

(10) Patent No.: US 11,853,113 B2
(45) Date of Patent: Dec. 26, 2023

(54) DEVICE FOR MONITORING THE EXECUTION OF AN APPLICATION, ASSOCIATED SET AND AVIONICS SYSTEM

(71) Applicant: THALES, Courbevoie (FR)

(72) Inventors: Gordon Sanderson, Merignac (FR); Cédric Balihaut, Merignac (FR); Philippe Dumercq, Merignac (FR)

(73) Assignee: THALES, Courbevoie (FR)

( * ) Notice: Subject to any disclaimer, the term of this patent is extended or adjusted under 35 U.S.C. 154(b) by 618 days.

(21) Appl. No.: 17/087,427

(22) Filed: Nov. 2, 2020

(65) Prior Publication Data

US 2021/0139162 A1    May 13, 2021

(30) Foreign Application Priority Data

Nov. 8, 2019   (FR) ...................... 19 12551

(51) Int. Cl.
*G06F 1/12*    (2006.01)
(52) U.S. Cl.
CPC ...................... *G06F 1/12* (2013.01)
(58) Field of Classification Search
CPC ........................................................ G06F 1/12
See application file for complete search history.

(56) References Cited

U.S. PATENT DOCUMENTS

| | | | |
|---|---|---|---|
| 6,292,045 B1 | 9/2001 | Bongiorno et al. | |
| 2002/0044530 A1* | 4/2002 | Oohara | G06F 11/0757 370/242 |
| 2006/0053349 A1* | 3/2006 | Ozawa | G06F 11/0757 714/E11.003 |
| 2014/0013150 A1 | 1/2014 | Kaltenegger et al. | |
| 2017/0344052 A1* | 11/2017 | Hegde | G06F 1/06 |

FOREIGN PATENT DOCUMENTS

EP    2624139 A1    8/2013

OTHER PUBLICATIONS

French Search Report issued by the French Patent Office in corresponding French Application No. 1912551, dated Jul. 13, 2020.

* cited by examiner

*Primary Examiner* — Stefan Stoynov
(74) *Attorney, Agent, or Firm* — ArentFox Schiff LLP

(57) ABSTRACT

A device for monitoring the execution of an application on a processor, the device comprising:
  a time counter,
  a control module configured to reset the time counter at the end of a time period if a reset command has been received by the monitoring device in a time window and to generate a sanction command of the processor otherwise,
  an inhibition module configured to inhibit the time counter during the reception of an inhibition command at the input of the monitoring device, and
  a reactivation module configured to reactivate the time counter during the reception of a reactivation command at the input of the monitoring device.

11 Claims, 2 Drawing Sheets

DEVICE FOR MONITORING THE EXECUTION OF AN APPLICATION, ASSOCIATED SET AND AVIONICS SYSTEM

CROSS-REFERENCE TO RELATED APPLICATIONS

This application claims priority to French Patent Application No. 19 12551, filed on Nov. 8, 2019. The disclosure of the priority application is incorporated in its entirety herein by reference.

BACKGROUND

Technical Field

The present invention relates to a device for monitoring the execution of an application on a processor. The present invention further relates to an assembly comprising a processor and such a monitoring device. The present invention also relates to an associated avionics system.

Description of the Related Art

In the avionics field, monitoring devices, also called watchdog devices, are used to control the operation of critical systems.

Such monitoring devices are electronic circuits or software making it possible to verify the proper operation of the real-time execution of an application on a processor. To this end, a predetermined sequence is for example periodically refreshed in a predetermined time window following the reception of instructions. When no instruction is received in the predetermined time window, the predetermined sequence is not refreshed and an alert is launched. The principle of such a monitoring device is that, once triggered, it can no longer be disengaged by the processor that it controls, so as to eliminate incorrect operation of the processor or of the applications executed by the processor.

Avionics systems, and in particular systems based on the IMA (Integrated Modular Avionics) processor platform, are based on periodic executions in given time windows. Such a platform is in particular able to synchronize the real-time planning of the operating system on an external synchronization source.

Yet it is preferable for the synchronization with external synchronization sources to be robust relative to the loss and return of the synchronization source.

In the known systems, in case of loss of the external synchronization, the monitoring device emits an alert that causes a fatal malfunction of the processor and causes the processor to be reset in an internal synchronization mode. Indeed, the current monitoring devices, once armed, are activated upon changing synchronization reference for rearming because either the rearming frequency is not kept, or the rearming takes place outside the defined time window.

There is therefore a need for a monitoring device allowing reliable control of a processor even during a change in the synchronization source of the processor.

SUMMARY OF THE INVENTION

To this end, the invention relates to a device for monitoring the execution of an application on a processor, the device comprising:

an input for receiving input commands from the processor, each input command being chosen from: a reset command, an inhibition command and a reactivation command,
an output for sending a sanction command of the processor,
a time counter,
a control module of the time counter, the control module being configured to reset the time counter at the end of a time period of predetermined duration, called reset period, if a reset command has been received at the input of the monitoring device in a time window of predetermined duration, called reset window, and to generate a sanction command of the processor otherwise,
an inhibition module of the time counter, the inhibition module being configured to inhibit the time counter during the reception of an inhibition command at the input of the monitoring device, and
a reactivation module of the time counter, the reactivation module being configured to reactivate the time counter during the reception of a reactivation command at the input of the monitoring device.

According to other advantageous aspects of the invention, the monitoring device comprises one or more of the following features, considered alone or according to any technically possible combination(s):

the reactivation module is further configured to reactivate the time counter when the inhibition duration of the time counter is strictly greater than a maximum inhibition duration;
the inhibition module is configured to inhibit the time counter only when the number of inhibition commands received over a sliding period of predetermined duration is less than or equal to a maximum number;
when the number of inhibition commands received over the sliding period is strictly greater than the maximum number, the control module is configured to generate a sanction command of the processor;
the duration of the reset window is equal to the duration of the reset period;
the duration of the reset window is strictly less than the duration of the reset period, advantageously the end of the reset period being equal to the end of the reset period.

The invention further relates to an assembly comprising:
a processor configured to execute an application, and
a device for monitoring the execution of the application on the processor as previously described.

According to other advantageous aspects of the invention, the assembly comprises one or more of the following features, considered alone or according to any technical possible combinations:

the processor interacts with an operating system, the processor being configured to be synchronized over time on at least one external synchronization source, each time the current synchronization source of the processor is replaced by an external synchronization source different from the current synchronization source, the operating system being configured to place the application(s) executed by the processor in standby until the processor resynchronizes itself on said external synchronization source, the operating system further being configured to send an inhibition command to the monitoring device in parallel with the placement in standby of the application(s) and to send a reactivation command to the monitoring device once the processor is resynchronized on the external synchronization source;

at least one external synchronization source of the processor is an internal synchronization source of another processor belonging to the same equipment as the processor or to different equipment, or an internal synchronization source of a display device, or a synchronization source of an avionics network.

The invention also relates to an avionics system comprising an assembly as previously described.

BRIEF DESCRIPTION OF THE DRAWINGS

Other features and advantages of the invention will appear upon reading the following description of embodiments of the invention, solely as an example and done in reference to the drawings, which are.

DETAILED DESCRIPTION OF THE PREFERRED EMBODIMENTS

Figure 1:
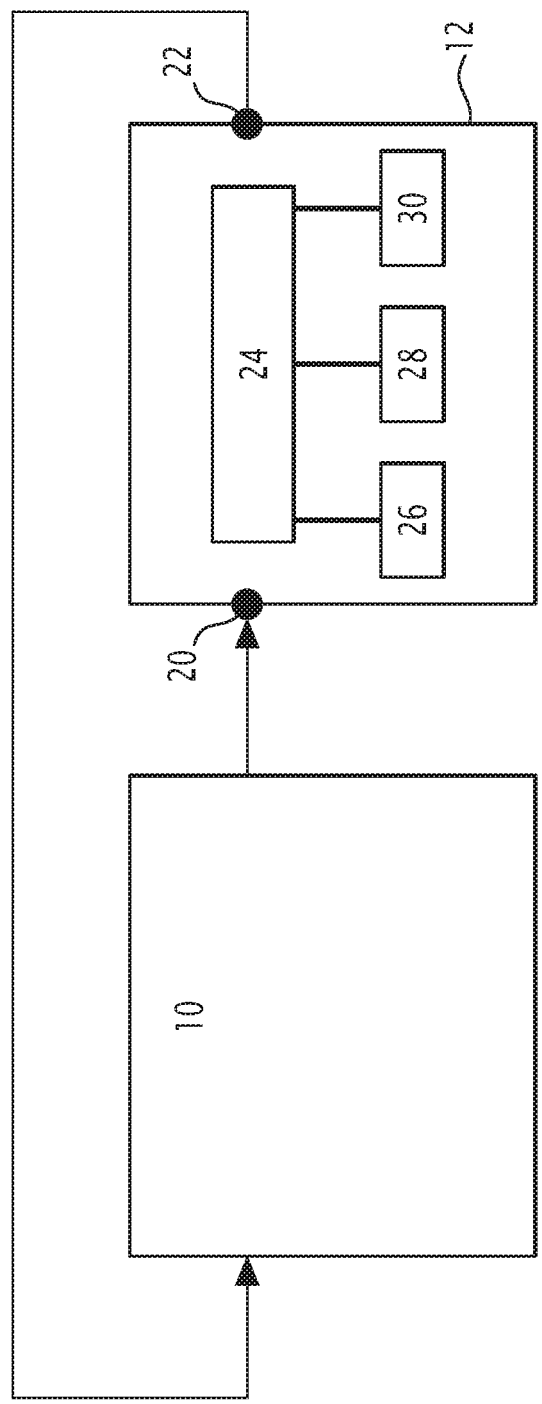
FIG. 1, a schematic illustration of a processor and a monitoring device of the processor, and FIG. 2, a schematic illustration of an example of resynchronization, on an external synchronization source, of an assembly comprising a processor and a monitoring device.

A processor 10 and a monitoring device 12 of the processor 10 are illustrated by FIG. 1. The assembly formed by the processor 10 and the monitoring device 12 is, for example, suitable for being implemented in an avionics system, for example in the IMA platform of an avionics system.

The processor 10 is a computer configured to execute software programs, also called applications. The processor 10 interacts with an operating system. The operating system is a software program that controls the use of the resources of the processor by the applications.

Advantageously, the processor 10 is a microprocessor.

In one example, the processor 10 is configured to be synchronized on an external synchronization source.

The external synchronization source of the processor 10 is for example an internal synchronization source of another processor belonging to the same equipment or to different equipment of the processor 10, or an internal synchronization source of the display device (the synchronization of which for example makes it possible to refresh video frames to be displayed), or a synchronization source of an avionics network.

In a variant, the processor 10 is configured to be synchronized over time on several different synchronization sources, in particular on internal and/or external synchronization sources.

The operating system of the processor 10 is configured to place the applications executed on the processor 10 in standby each time the current synchronization source of the processor 10 is replaced by an external synchronization source different from the current synchronization source, until the processor 10 synchronizes itself on said external synchronization source. The external synchronization source in particular has a period identical to the current synchronization source and a phase (or delay) that may potentially be different from the current synchronization source. The synchronization consists of compensating this phase difference (or delay).

The operating system is further configured to send an inhibition command to the monitoring device, in parallel with the placement of the applications in standby, and a reactivation command to the monitoring device once the processor 10 is synchronized on said external synchronization source (therefore at the end of the standby period of the applications). Such commands will be described in the remainder of the disclosure.

The monitoring device 12 is configured to monitor the execution of applications on the processor 10. The monitoring device 12 comprises an input 20, an output 22, a time counter 24, a control module 26, an inhibition module 28 and a reactivation module 30.

The input 20 of the monitoring device 12 is connected to an output 22 of the processor 10.

The input 20 of the monitoring device 12 is able to receive input commands from the processor 10. Such input commands are generated by the operating system of the processor 10.

Each input command is a sequence of instructions. The input commands are advantageously chosen from: a reset command, an inhibition command and a reactivation command. A reset command, also called rearming command, is a command seeking to reset the time counter 24 of the monitoring device 12. An inhibition command is a command seeking to inhibit the time counter 24 of the monitoring device 12. A reactivation command is a command seeking to reactivate the time counter 24 of the monitoring device 12 when the latter has previously been inhibited.

The output 22 of the monitoring device 12 is connected to an input 20 of the processor 10.

The output 22 of the monitoring device 12 is able to send sanction commands of the processor 10. The sanction commands are generated by the control module 26. The sanction commands are commands indicative of an operating malfunction of the processor 10 (hardware malfunction) and/or of the application (software malfunction).

The sanction commands are intended to trigger an action such as an interruption of the processor 10, decommissioning of the processor 10 or restarting of the processor 10.

The time counter 24 is configured to define time periods.

The time counter 24 is for example made in software form.

In a variant, the time counter 24 is made in the form of an electronic circuit. The electronic circuit for example comprises at least one monostable trigger circuit.

The control module 26 is configured to reset, that is to say, to set to zero or to rearm, the time counter 24 at the end of a time period of predetermined duration, called reset period $P_{init}$, if a reset command has been received at the input 20 of the monitoring device 12 in a time window of predetermined duration, called reset window $F_{init}$. The reset period $P_{init}$ is therefore the period between two consecutive resets. The reset window $F_{init}$ is the margin of error around the theoretical reset moment. The reset window $F_{init}$ is comprised in the reset period $P_{init}$. Otherwise, the control module 26 is configured to generate a sanction command of the processor 10.

The duration of the reset period $P_{init}$ is predetermined during the configuration of the monitoring device 12, that is to say before commissioning thereof. Likewise, the duration, the beginning and the end of the reset window $F_{init}$ are predetermined during the configuration of the monitoring device 12.

In a first example, the duration of the reset window $F_{init}$ is strictly less than the duration of the reset period $P_{init}$. In this case, the monitoring device 12 is commonly called "time window watch dog". Advantageously, the end of the reset window $F_{init}$ is equal to the end of the reset period $P_{init}$.

In a second example, the duration of the reset window $F_{init}$ is equal to the duration of the reset period $P_{init}$. In this case, the reset of the time counter 24 is done irrespective of the reception instant of the reset command in the reset period $P_{init}$.

The rearming command of the time counter 24 can be received at each instant of the reset period $P_{init}$.

Advantageously, the control module 26 is also configured to generate sanction commands in at least one other scenario that is described in the remainder of the disclosure.

The inhibition module 28 is configured to inhibit the time counter 24 during the reception of an inhibition command at the input 20 of the monitoring device 12. The term "inhibit the time counter" means to stop the time counter 24 without resetting it.

Advantageously, the inhibition module 28 is configured to inhibit the time counter 24 only when the number of inhibition commands received over a sliding period of predetermined duration is less than or equal to a maximum number. This makes it possible to control the number of inhibition requests per unit of time. Preferably, when the number of inhibition commands received over the sliding period is strictly greater than the maximum number, the control module 26 is configured to generate a sanction command of the processor 10.

The duration of the sliding period and the maximum number are predetermined during the configuration of the monitoring device 12. The maximum number is greater than or equal to zero.

The reactivation module 30 is configured to reactivate the time counter 24 during the reception of a reactivation command at the input 20 of the monitoring device 12. "Reactivate" means that the time counter 24 resumes the counting of time from the moment where it was inhibited. The time counter 24 is therefore not reset to zero.

Advantageously, the reactivation module 30 is further configured to reactivate the time counter 24 when the inhibition duration of the time counter 24 is strictly greater than a maximum inhibition duration. This makes it possible to ensure that the deactivation of the time counter 24 is temporary: that is to say that the duration of the inhibition is bounded (automatic rearming after a time defined during configuration).

The maximum inhibition duration is predetermined during the configuration of the monitoring device 12. For example, the maximum inhibition duration is less than or equal to two times the predetermined duration of the reset period $P_{init}$.

The operation of the assembly formed by the processor 10 and the monitoring device 12 will now be described.

Initially, the time counter 24 of the monitoring device 12 is reset to zero.

When the reset command is received at the input 20 of the monitoring device 12 and said command is received in the reset window $F_{init}$, the control module 26 resets the time counter 24 at the end of the reset period $P_{init}$. Otherwise, that is to say if the reset command is not received in the reset window $F_{init}$ or if no reset command has been received, the control module 26 generates a sanction command of the processor 10. This sanction command is sent at the output 22 of the monitoring device 12.

When an inhibition command is received at the input 20 of the monitoring device 12, the inhibition module 28 inhibits the time counter 24. Advantageously, such an inhibition takes place only if a condition relative to the number of inhibition commands received over a sliding period is met. Advantageously, when this condition is not met, the control module 26 generates a sanction command of the processor 10.

When a reactivation command is received at the input 20 of the monitoring device 12, the reactivation module 30 reactivates the time counter 24. Advantageously, when the inhibition duration of the time counter 24 is strictly greater than a maximum inhibition duration, in the absence of reactivation command, the reactivation module 30 reactivates the time counter 24. Optionally, the control module 26 generates a sanction command of the processor 10 when the reactivation module 30 reactivates the processor 10 in the absence of reactivation command.

Figure 2:
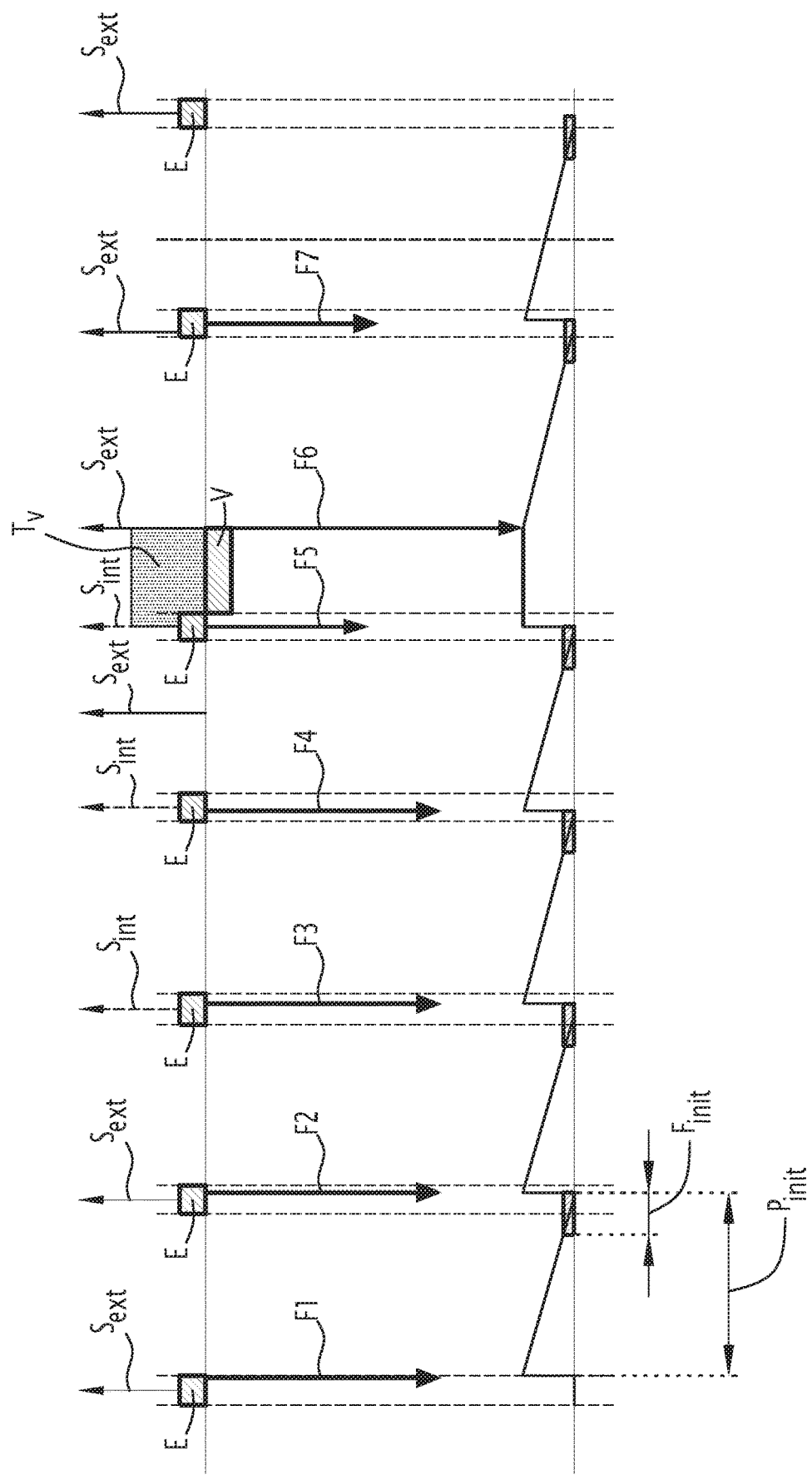

The example of FIG. 2 illustrates the operation of the assembly formed by the processor 10 and the monitoring device 12 in the case of the loss of an external synchronization, followed by the return of this external synchronization.

In this FIG. 2, the different synchronizations are reflected by arrows pointing upward. In particular, the arrows $S_{ext}$ in solid lines illustrate the synchronization of the processor 10 on an external synchronization source and the arrows $S_{int}$ in dotted lines illustrate the synchronization of the processor 10 on an internal synchronization source.

The top line of FIG. 2 illustrates the execution of an application on the processor 10 over time. In this example, the time counter 24 performs a countdown. The execution is reflected by the crosshatched squares E. The placement of the application in standby due to a change in synchronization is embodied by a crosshatched rectangle V. The duration for the processor 10 to resynchronize itself on the external synchronization source from the reappearance of this external source is denoted Tv and is embodied by a rectangle with dots.

During its execution, the operating system of the processor 10 sends commands to the processor 10. These commands are reflected by bold arrows. In particular, the arrows F1, F2, F3, F4 and F7 each reflect a reset command. The arrow F5 reflects an inhibition command. The arrow F6 reflects a reactivation command.

The bottom line of FIG. 2 illustrates the operation of the time counter 24 of the monitoring device 12. As shown in this figure, during normal operation (reset commands F2, F3, F4 and F7 received in the reset window $F_{init}$), the time counter 24 is decremented until the end of the reset period $P_{init}$. When the monitoring device 12 receives an inhibition command F5, the time counter 24 is inhibited. When the monitoring device 12 receives a reactivation command F6, the time counter 24 is reactivated.

Thus, in this example, initially, the processor 10 is synchronized on an external synchronization source $S_{ext}$. The operating system of the processor 10 then sends the reset commands F1 and F2 to the monitoring device 12 in order to rearm the time counter 24. Upon losing the external synchronization, the processor 10 resynchronizes itself on an internal synchronization source $S_{int}$. This does not cause a change from the perspective of the processor 10 and the sending date of the reset commands F3 and F4. When the external synchronization source $S_{ext}$ reappears, the application is placed in standby until the processor 10 resynchronizes itself on the reappeared external synchronization source. In parallel with the placement of the application in standby, the processor 10 sends an inhibition command F5 to the monitoring device 12, which results in inhibiting the time counter 24. At the end of the placement of the application in standby, that is to say once the processor 10 is resynchronized on the external synchronization source, the operating system of the processor 10 sends a reactivation command F6 to the monitoring device 12.

Thus, the monitoring device 12 is configured to adapt to different situations encountered by an application executed on a processor 10, and in particular the loss of the external synchronization of the processor 10. Such a monitoring device 12 makes it possible to change the synchronization moment of the application without being triggered and causing sanctions. This allows reliable control of a processor 10 even during a change in the synchronization source of the processor 10.

Furthermore, controlling the number of requested inhibitions and the inhibition duration makes it possible to control the operation of the monitoring device 12, independently of the commands coming from the processor 10, which makes it possible to preserve the safety of the monitoring device 12. The resynchronization actions are therefore temporary, which makes it possible to preserve the safety and to guarantee the independence of the monitoring device 12 with respect to the processor 10.

Thus, with such a monitoring device 12, the principle of resynchronization "exception" is not the normal operating mode, and the operating independence of the monitoring device 12 is preserved, as are its abilities to detect software malfunctions. Such a monitoring device 12 is therefore fully capable of being used in avionics systems, and in particular of being certifiable according to standard DO254.

One skilled in the art will understand that the embodiments previously described can be combined with one another when such a combination is compatible.

The invention claimed is:

1. A device for monitoring the execution of an application on a processor, the device comprising:
   an input for receiving input commands from the processor, each input command being chosen from: a reset command, an inhibition command and a reactivation command,
   an output for sending a sanction command of the processor,
   a time counter,
   a control module of the time counter, the control module being configured to reset the time counter at the end of a time period of predetermined duration, called reset period, if a reset command has been received at the input of the monitoring device in a time window of predetermined duration, called reset window, and to generate a sanction command of the processor otherwise,
   an inhibition module of the time counter, the inhibition module being configured to inhibit the time counter during the reception of an inhibition command at the input of the monitoring device, and
   a reactivation module of the time counter, the reactivation module being configured to reactivate the time counter during the reception of a reactivation command at the input of the monitoring device.

2. The device according to claim 1, wherein the reactivation module is further configured to reactivate the time counter when the inhibition duration of the time counter is strictly greater than a maximum inhibition duration.

3. The device according to claim 1, wherein the inhibition module is configured to inhibit the time counter only when the number of inhibition commands received over a sliding period of predetermined duration is less than or equal to a maximum number.

4. The device according to claim 3, wherein when the number of inhibition commands received over the sliding period is strictly greater than the maximum number, the control module is configured to generate a sanction command of the processor.

5. The device according to claim 1, wherein the duration of the reset window is equal to the duration of the reset period.

6. The device according to claim 1, wherein the duration of the reset window is strictly less than the duration of the reset period.

7. The device according to claim 6, wherein the end of the reset window is equal to the end of the reset period.

8. An assembly comprising;
   a processor configured to execute an application, and
   a device for monitoring the execution of the application on the processor according to claim 1.

9. The assembly according to claim 8, wherein the processor interacts with an operating system, the processor being configured to be synchronized over time on at least one external synchronization source, each time the current synchronization source of the processor is replaced by an external synchronization source different from the current synchronization source, the operating system being configured to place the application executed by the processor in standby until the processor resynchronizes itself on said external synchronization source, the operating system further being configured to send an inhibition command to the monitoring device in parallel with the placement in standby of the application and to send a reactivation command to the monitoring device once the processor is resynchronized on the external synchronization source.

10. The assembly according to claim 9, wherein at least one external synchronization source of the processor is an internal synchronization source of another processor belonging to the same equipment as the processor or to different equipment, or an interal synchronization source of a display device, or a synchronization source of an avionics network.

11. An avionics system comprising an assembly according to claim 8.

* * * * *